Oct. 18, 1955          A. B. DICKIE          2,720,787
MULTI-RANGE PRESSURE GAUGE
Filed Feb. 2, 1953          2 Sheets—Sheet 1
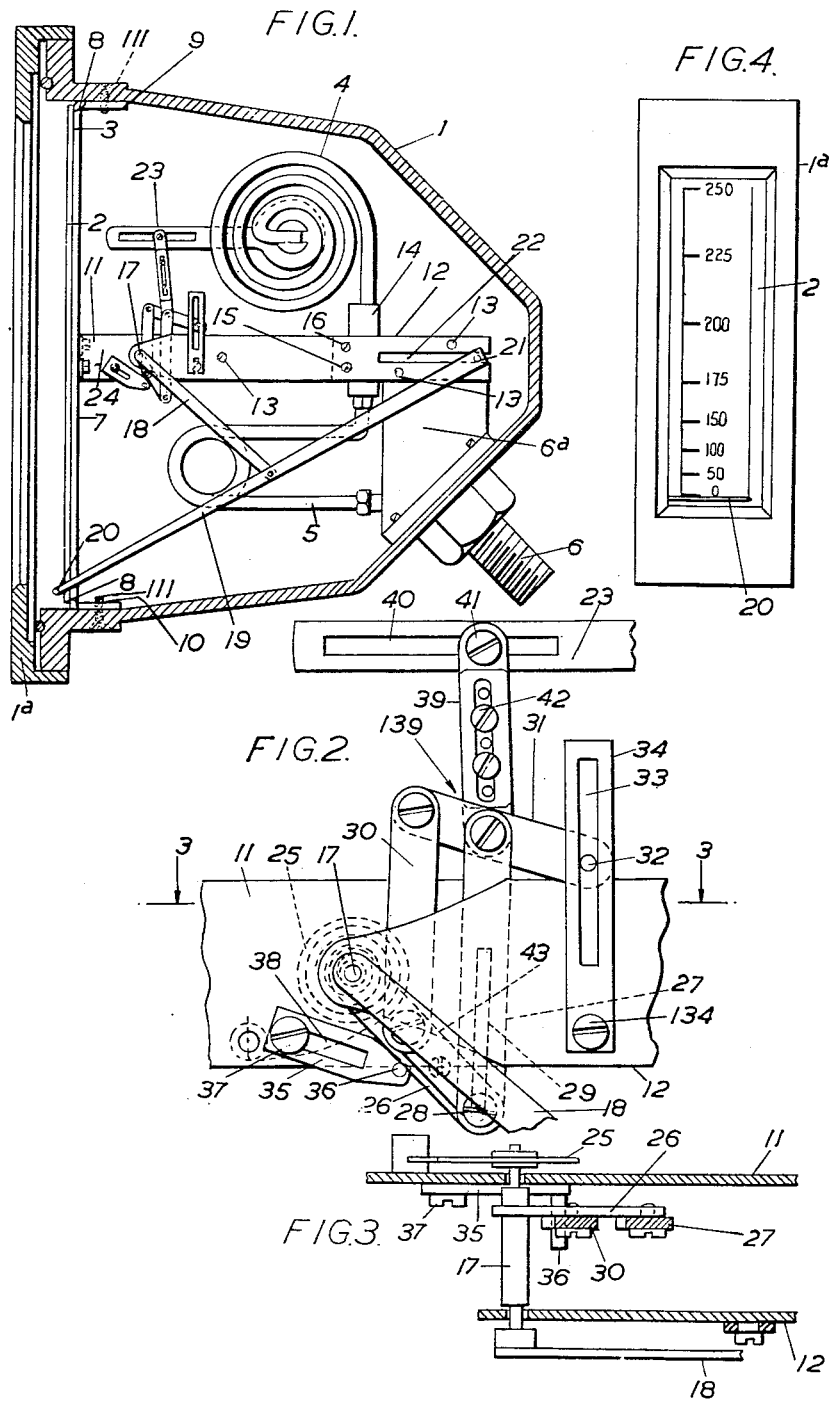
Inventor:
ALAN BAIN DICKIE Oct. 18, 1955    A. B. DICKIE    2,720,787
MULTI-RANGE PRESSURE GAUGE
Filed Feb. 2, 1953    2 Sheets-Sheet 2
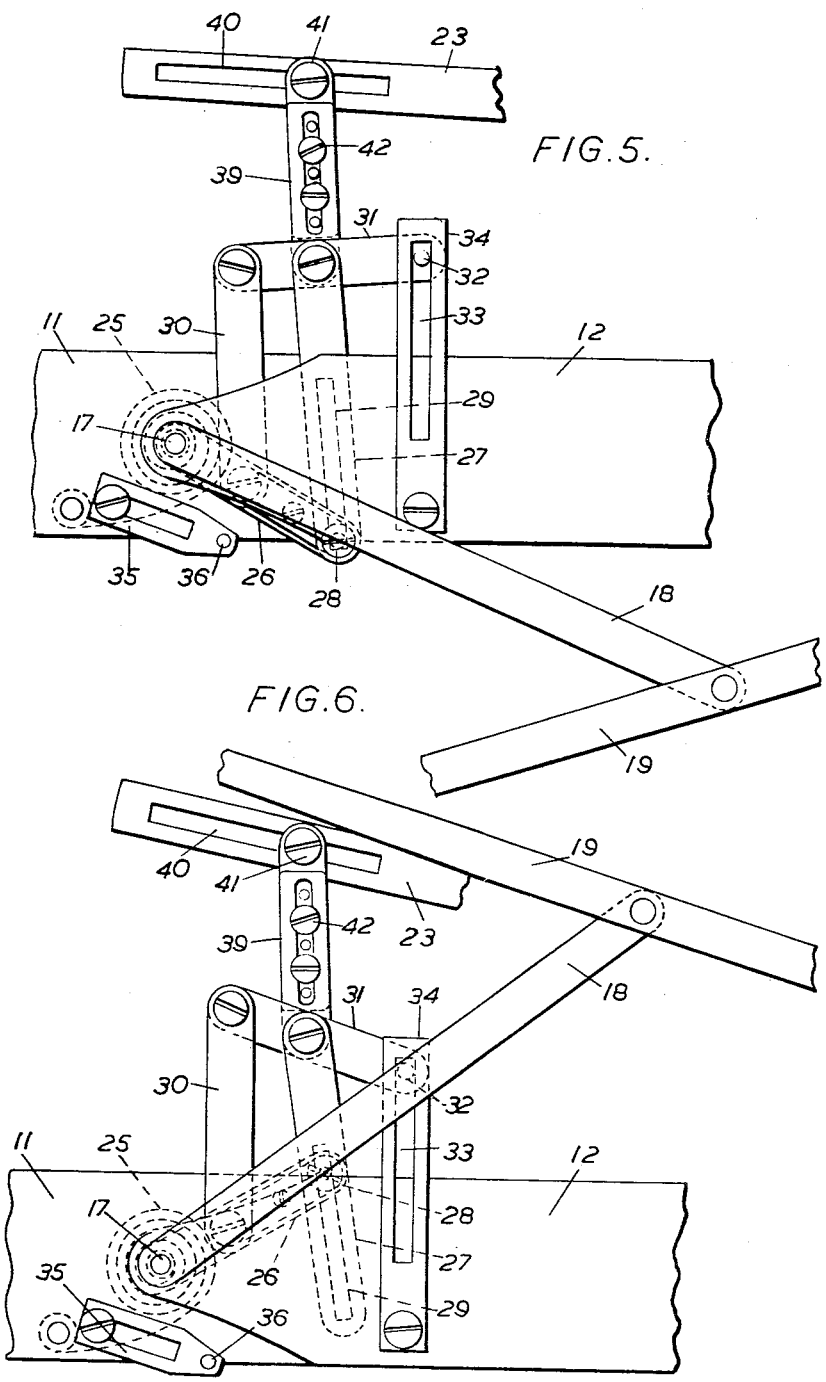
Inventor:
ALAN BAIN DICKIE United States Patent Office 2,720,787
Patented Oct. 18, 1955

2,720,787
MULTIRANGE PRESSURE GAUGE

Alan Bain Dickie, Bath, England, assignor to Sydney Smith and Sons (Nottingham) Limited, Nottingham, England Application February 2, 1953, Serial No. 334,669

Claims priority, application Great Britain May 29, 1952

10 Claims. (Cl. 73—397)

This invention is for improvements in and relating to indicating or recording instruments and is particularly concerned with instruments of the kind that are constructed and arranged to indicate or record a single variable factor by a movable member having a range of movement divided into at least two separate parts and having a motion transmitting device for transmitting motion to the movable member at a different rate for one part of the range of movement from that at another part or parts of such range. One example of this construction is disclosed in the specification of Patent No. 656,775 wherein the motion transmitting device includes a rotary disc cam and a rotary follower and the particular instrument disclosed is a circular dial type steam pressure guage in which the pointer moves at a slower speed through a first range of movement and at a faster speed through a second range of movement.

An object of the invention is to provide in or for an instrument of the kind referred to, motion transmitting mechanism particularly but not exclusively suitable for instruments of the edgewise scale type such for example as that disclosed in the specification of British Patent No. 616,161 in which one end of a pointer is constrained to move in a path at right angles to that of the indicating end of the pointer.

The invention provides an instrument of the kind referred to having said motion transmitting device composed of link and leverage mechanism. Conveniently said mechanism is such as to provide two different value lever motions and to include an automatically operating control device for instantaneously transferring from one of said motions to the other.

In one arrangement there is a pivoted arm operative to move the movable member, consequent upon variations in the factor, through the medium of at least two alternatively-effecting link connections to the arm located at different distances from the pivot, that link furthest from said pivot having a slotted connection to the arm and being connected to the other link by a cross lever whereof one end is adapted to have movement to and from a stationary abutment, and said furthest link being connected to a detector automatically influenced by said factor, so that, for an early part of said range, the movable member is movable by said furthest link at a comparatively slow constant rate for constant variations in the factor, and, for a later part of said range the movable member is movable by said other link through the medium of said cross lever, when the latter engages the stop, at a comparatively quick constant rate for constant variations with factor.

The above and other features of the invention are disclosed in the detailed description given by way of example of the particular embodiment illustrated in the accompanying drawings in which:

Figure 1 is a sectional view of an instrument according to the invention,

Figure 2 is an enlarged detail of the motion transmitting mechanism therein, with the parts in the zero position as in Figure 1, Figure 3 is a sectional plan on the line 3—3 of Figure 2, Figure 4 is a front view of the instrument, Figure 5 is a view similar to Figure 2 but with the parts in an intermediate position, and Figure 6 is a similar view with the parts in the extreme advanced position.

Referring now to the drawings, an edgewise type dial gauge is provided comprising a casing with removable front cover 1a, a scale strip 2 fastened to the casing through the medium of a frame 3 which in side elevation is of the shape of a letter T on its side (Figure 1), a Bourdon tube 4 (constituting the aforesaid detector) mounted on the rearwardly-extending part of said frame 3, and a capillary tube 5 connecting said Bourdon tube 4 to an inlet pipe 6 which is fixed to the casing 1 and has a mounting 6a connected to the rear end of the frame 3.

The frame 3 conveniently consists of a front upright part 7 carrying said scale 2 and having transverse cutouts 8 and upper and lower flanges 9, 10 for fixing to the casing by screws 111, and of a pair of spaced rearwardly-directed horizontal support strips 11, 12, whereof the strip 11 which is longer than the strip 12 bridges and is fixed to the said part 7 and the pipe mounting 6a, whilst the other strip 12 is fixed to the strip 11 by pins 13 which have spacing elements on them.

A block 14 connecting the outer end of the Bourdon tube 4 to the capillary tube 5 extends between the strips 11 and 12 near their rear end and is fixed thereto by screws 15, 16. An indicator shaft 17 has bearings in the strips 11, 12 (Fig. 3) and has fixed to it, at one end, a connecting member 18 which is connected to a pointer arm 19 substantially midway along the length of the latter, whilst at its rear end the indicator shaft is connected to a watch type spring 25. This pointer arm 19 has a bent over end pointer portion 20 at the front end for co-operating with the dial 2, and its other end is constrained by a peg 21 thereon riding in a slot 22 in the supporting strip 12 to ensure that the motion of the pointer 20 over the scale is parallel thereto.

Movement generated by the Bourdon tube 4 is communicated to the pointer 20 through the intermediary of an actuating arm 23 fixed to the appropriate end of the Bourdon tube, and a link and lever mechanism indicated generally at 24, which mechanism is connected to the aforesaid pivot pin 17, and is disposed to operate mainly between the said strips 11, 12 (Fig. 3). The arm 23 moves upward when moving away from zero position, and moves downwards when returning to the zero position. The invention also provides an indicating or recording instrument having said link and leverage mechanism incorporated in its movement.

More specifically, said indicator shaft 17 has fixed to it a radial arm 26 (the aforesaid pivoted arm) to the outer end of which is pivoted a link member 27, the pivotal connection being by a pin 28 and slot 29 connection permitting sliding of the pin 28 in slot 29. The pivoted arm 26 also has pivoted to it a connecting link 30, at a location nearer to the shaft 17 than to the link 27. The two links 27, 30 are connected pivotally by a double-arm lever 31, a rearwardly-projecting end of which has a pin 32 adapted for riding in a slot 33 of a stationary guiding member 34 fixed to the strip 12 by screw 134. There is also provide a stop arm 35, with stop peg 36, said arm being fixed by screw 37 and slot connection 38 to strip 12 and being adjustable for determining the zero position of the mechanism and pointer. There is also provided a link member 39 connecting said actuating arm 23 to the lever 31 at the location 139 of the connection of the link 27 to said lever.

Any suitable adjustment means may be provided for the purpose of initially setting the leverage motions of the mechanism or subsequently varying them as desired. Such means for example may consist of said actuating arm 23 having a slot 40 for screw 41 connecting the link 39 to it, and said link member 39 may be in two superimposed parts connected by screw 42 and slot connections. Furthermore the pivoted arm 26 may carry a subsidiary lever 126 which is fixed by a screw 43 and to which the links 27 and 30 are connected.

In use, the operation of the instrument during an early part of the range, consists in the initial upward movement of the operating arm 23 moving the pointer 20 at a comparatively slow constant rate for constant variations in the factor to which the Bourdon tube is responding, this movement occurring by direct transmission through links 39 and 27 to the pivoted arm 26 (the peg 32 riding upwardly along the slot 33 during such movements). Fig. 5 shows the position of the parts at the end of this initial movement, the pin 32 having reached the top of slot 33. During the latter part of the range of the instrument however, the peg 32 abuts against the upper end of slot 33, thus causing lever 31 to be rocked (clockwise in the drawings) and impart movements to link 30 and arm 26 at a greater rate than that at which such lever and arm are moved by the link 27. The pivoted arm 26 (and pointer 20) is now moved by the link 30 only, at a greater rate than before, these quicker movements being allowed for by peg 28 riding along slot 29. By comparing Figs. 5 and 6 it will be seen that whereas in Fig. 5 pin 28 is at the bottom of slot 29, having so far been lifted only by the link 27, in Fig. 6 the pin 28 is well up the slot 29, having now been raised by link 30.

Although the transmission mechanism has been described above in detail with respect to the edgewise scale type gauge it may be employed in any other gauge of the kind referred to with or without suitable modifications within the scope of the invention according to requirements.

The scale 2, of course, is marked with graduations at appropriately different spacing for one part than another, for example as illustrated in Fig. 4. When the instrument is to be used for recording purposes, the scale 2 could be arranged to travel say from one drum or roller to another, in a path at right angles to the path of the pointer.

We claim:

1. In an instrument of the type described, in combination, a driving detector element including an actuating arm movable in one direction; a link means pivotally connected at one end thereof to said actuating arm of said driving detector element and extending substantially in said one direction; a turnable indicator shaft extending transversely to said one direction; a radial arm secured to said indicator shaft and having an end portion slidably mounted on the other end of said link means; a double-arm lever pivotally mounted on said link means and extending transversely thereto; a connecting link pivotally connected at one end thereof to one end of said double-arm lever and at the other end thereof pivotally connected to the said radial arm at a point intermediate said end portion thereof and said indicator shaft; a stationary guiding member guiding the other end of said double-arm lever turnably, and slidable in said one direction so that movement of said actuating arm of said driving detector element and of said link means effect sliding of said other end of said double-arm lever in said one direction, and turning of said radial arm and of said indicator shaft at a first speed corresponding to a first measuring range of said detector element; and stop means on said guide means blocking sliding of said other end of said double-arm lever in a predetermined position corresponding to the beginning of a second measuring range of said driving detector element, so that further movement of said actuating arm of driving detector element effects turning of said double-arm lever on said guiding means about said other end thereof, and movement of said radial arm through said connecting link while said end portion of said radial arm slides relative to said link means whereby said indicator shaft is turned at a higher speed corresponding to said second measuring range of said detector element.

2. In an instrument of the type described, in combination, a driving detector element including an actuating arm movable in one direction; a link means including two pivotally connected link members and extending substantially in said one direction, one of said link members having a free end portion pivotally connected to said actuating arm, and the other link member having a free end portion formed with a slot; a turnable indicator shaft extending transversely to said one direction; a radial arm secured to said indicator shaft and having an end portion slidably mounted in said slot in said other link member; a double-arm lever pivotally connected to said first link member and extending transversely thereto; a connecting link pivotally connected at one end thereof to one end of said double-arm lever and at the other end thereof pivotally connected to said radial arm at a point intermediate said end portion thereof and said indicator shaft; a stationary guiding member formed with an elongated guiding slot extending substantially in said one direction; and a pin on the other end of said double-arm lever slidably guided in said elongated guiding slot so that movement of said actuating arm of said driving detector element and of said link means effect sliding of said other end of said double-arm lever in said one direction, and turning of said radial arm and of said indicator shaft at a first speed corresponding to a first measuring range of said detector element, said pin on said other end of said double-arm lever being blocked when engaging an end of said guiding slot in a predetermined position of said actuating arm corresponding to the beginning of a second measuring range of said driving detector element so that further movement of said actuating arm of said driving detector element effects turning of said double-arm lever about said blocked pin on said other end thereof, and movement of said radial arm through said connecting link while said end portion of said radial arm slides in said slot in said other link member whereby said indicator shaft is turned at a higher speed corresponding to said second measuring range of said detector element.

3. In an instrument of the type described, in combination, a driving detector element including an actuating arm movable in one direction; a link means including two pivotally connected link members and extending substantially in said one direction, one of said link members having a free end portion pivotally connected to said actuating arm, and the other link member having a free end portion formed with a slot; a turnable indicator shaft extending transversely to said one direction; a radial arm secured to said indicator shaft and having an end portion; a pin on said end portion of said radial arm slidably mounted in said slot in said other link member; a double-arm lever pivotally connected to said first link member and extending transversely thereto; a connecting link pivotally connected at one end thereof to one end of said double-arm lever and at the other end thereof pivotally connected to said said radial arm at a point intermediate said end portion thereof and said indicator shaft; a stationary guiding member formed with an elongated guiding slot extending substantially in said one direction; and a pin on the other end of said double-arm lever slidably guided in said elongated guiding slot so that movement of said actuating arm of said driving detector element and of said link means effect sliding of said other end of said double-arm lever in said one direction, and turning of said radial arm and of said indicator shaft at a first speed corresponding to a first measuring range of said detector element, said pin on said other end of said double-arm lever being blocked when engaging an end of said guiding slot in a predetermined position of said actuating arm corresponding to the beginning of a second measuring range of said driving detector element so that further movement of said actauting arm of said driving detector element effects turning of said double-arm lever about said blocked pin on said other end thereof, and movement of said radial arm through said connecting link while said pin on said end portion of said radial arm slides in said slot in said other link member whereby said indicator shaft is turned at a higher speed corresponding to said second measuring range of said detector element.

4. An arrangement as claimed in claim 3 wherein said actuating arm is formed with a slot, and wherein said free end of said one of said link members is pivotally and adjustably mounted in said slot in said actuating arm.

5. An arrangement as claimed in claim 3 and including means for adjusting the length of said one link member.

6. An arrangement as claimed in claim 3 and including an adjustable stop means cooperating with said radial arm of said indicator shaft for blocking the same in a position corresponding to initial zero position of said driving detector element.

7. An arrangement as claimed in claim 3 and including means for adjusting the position of said guiding member and of said guiding slot.

8. In an instrument of the type described, in combination, a driving detector element including an actuating arm movable in one direction; a link means including two pivotally connected link members and extending substantially in said one direction, one of said link members having a free end portion pivotally connected to said actuating arm, and the other link member having a free end portion formed with a slot; a turnable indicator shaft extending transversely to said one direction; a radial arm secured to said indicator shaft and having an end portion; a pin on said end portion of said radial arm slidably mounted in said slot in said other link member; a double-arm lever pivotally connected to said first link member and extending transversely thereto; a connecting link pivotally connected at one end thereof to one end of said double-arm lever and at the other end thereof pivotally connected to said radial arm at a point intermediate said end portion thereof and said indicator shaft; a stationary guiding member formed with an elongated guiding slot extending substantially in said one direction; a pin on the other end of said double-arm lever slidably guided in said elongated guiding slot so that movement of said actuating arm of said driving detector element and of said link means effect sliding of said other end of said double-arm lever in said one direction, and turning of said radial arm and of said indicator shaft at a first speed corresponding to a first measuring range of said detector element, said pin on said other end of said double-arm lever being blocked when engaging an end of said guiding slot in a predetermined position of said actuating arm corresponding to the beginning of a second measuring range of said driving detector element so that further movement of said actuating arm of said driving detector element effects turning of said double-arm lever about said blocked pin on said other end thereof, and movement of said radial arm through said connecting link while said pin on said end portion of said radial arm slides in said slot in said other link member whereby said indicator shaft is turned at a higher speed corresponding to said second measuring range of said detector element; a supporting member formed with a guide slot; a pointer arm-member having a pointer portion at one end thereof; a sliding peg secured to the other end of said pointer arm member and slidably mounted in said guide slot of said supporting member; and a connecting arm having one end secured to said indicator shaft, and the other end pivotally connected to said pointer arm member intermediate the ends of the same; and guide means for guiding said pointer portion along a straight path for movement along a straight dial whereby turning of said indicator shaft produces a straight movement of said pointer portion while said sliding peg slides in said guide slot of said supporting member.

9. An arrangement as claimed in claim 8 and including spring means secured at one end to said supporting member, and at the other end to said indicator shaft for returning the same to the initial zero position thereof.

10. An arrangement as claimed in claim 2 wherein said driving detector element is a Bourbon tube.

References Cited in the file of this patent
UNITED STATES PATENTS

| | | |
|---|---|---|
| 1,476,896 | Letsch | Dec. 11, 1928 |
| 1,803,996 | Clawson | May 5, 1931 |
| 1,848,489 | Motherwell | Mar. 8, 1932 |
| 2,377,755 | Buechman | June 5, 1945 |

FOREIGN PATENTS

| | | |
|---|---|---|
| 934,385 | France | Jan. 10, 1948 |
| 652,259 | Great Britain | Apr. 18, 1951 |